United States Patent
Tang et al.

(10) Patent No.: US 12,340,087 B2
(45) Date of Patent: Jun. 24, 2025

(54) I/O HOTSPOT DETECTION USING EXPONENTIAL MOVING AVERAGE

(71) Applicant: Huawei Technologies Co., Ltd., Guangdong (CN)

(72) Inventors: Zhihao Tang, Shrewsbury, MA (US); Lili Chen, Hopkinton, MA (US); Ning Wu, Northborough, MA (US); Hongliang Tang, Hopkinton, MA (US); Li Wan, Hopkinton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/355,140

(22) Filed: Jul. 19, 2023

(65) Prior Publication Data
US 2023/0359360 A1 Nov. 9, 2023

Related U.S. Application Data

(63) Continuation of application No. PCT/US2021/014897, filed on Jan. 25, 2021.

(51) Int. Cl.
*G06F 3/06* (2006.01)

(52) U.S. Cl.
CPC .......... *G06F 3/0611* (2013.01); *G06F 3/0631* (2013.01); *G06F 3/0673* (2013.01)

(58) Field of Classification Search
CPC .... G06F 3/06; G06F 12/0868; G06F 12/0862; G06F 12/121; H04L 67/1021; H04L 67/1031
See application file for complete search history.

(56) References Cited

U.S. PATENT DOCUMENTS

| | | | | |
|---|---|---|---|---|
| 8,566,483 B1* | 10/2013 | Chen | ...................... | G06F 3/0689 |
| | | | | 710/18 |
| 9,256,381 B1* | 2/2016 | Fultz | ...................... | G06F 16/185 |
| 10,409,501 B1* | 9/2019 | Kushner | ............... | G06F 3/0605 |
| 11,163,476 B2* | 11/2021 | Lyu | ........................ | G06F 3/0673 |
| 2005/0119996 A1* | 6/2005 | Ohata | ................. | G06F 11/3495 |
| 2019/0220217 A1* | 7/2019 | Kimmel | ................ | G06F 3/0649 |

(Continued)

FOREIGN PATENT DOCUMENTS

WO     WO-2022159113 A1     7/2022

OTHER PUBLICATIONS

"International Application Serial No. PCT/US2021/014897, International Search Report mailed Oct. 22, 2021", 4 pgs.

(Continued)

*Primary Examiner* — Khoa D Doan
(74) *Attorney, Agent, or Firm* — Schwegman Lundberg & Woesasner, P.A.

(57) ABSTRACT

A computer implemented method comprises accessing data stored in memory of the computer system, wherein the memory includes a faster access storage medium and a slower access storage medium; determining respective exponential moving averages of a number of access operations performed on respective memory locations of the memory; and transferring a portion of the data into the faster access storage medium and transferring a portion of the data into the slower access storage medium according to the determined exponential moving average.

16 Claims, 4 Drawing Sheets

(56) References Cited

U.S. PATENT DOCUMENTS

2020/0249838 A1* 8/2020 Martin .................. G06F 3/0683

OTHER PUBLICATIONS

"International Application Serial No. PCT/US2021/014897, Written Opinion mailed Oct. 22, 2021", 7 pgs.
"International Application Serial No. PCT US2021 014897, International Preliminary Report on Patentability mailed Aug. 3, 2023", 9 pages.

\* cited by examiner

I/O HOTSPOT DETECTION USING EXPONENTIAL MOVING AVERAGE

CROSS REFERENCE TO RELATED APPLICATION

This application is a continuation of International Application No. PCT/US2021/014897, filed 25 Jan. 2021, entitled "I/O Hotspot Detection Using Exponential Moving Average," the benefit of priority of which is claimed herein, and which application is incorporated herein by reference in its entirety.

BACKGROUND

Computing systems include one or more processors that operate on data stored in the computing system. The processors do not access the stored data equally and some data is needed more often in a given application than other data. Data that is visited the most often can be referred to as "hotspots" because of the high amount of memory accesses to the data. When hotspots are identified, the computing device may perform data management to address the high use of certain memory locations. Traditionally, hotspots are determined by simply counting the number of hits to memory addresses.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, there is provided a computer implemented method of managing stored data in a computer system. The method includes accessing data stored in memory of the computer system, wherein the memory includes a faster access storage medium and a slower access storage medium, determining respective exponential moving averages of a number of access operations performed on respective memory locations of the memory, and transferring a first portion of the data into the faster access storage medium and transferring a second portion of the data into the slower access storage medium according to the determined exponential moving average.

Optionally in the preceding aspect, another implementation of the aspect provides determining a count of the number of access operations to a memory location, and weighting the determined count using an exponential factor calculated using a time duration since a last refresh of the count.

Optionally in the preceding aspect, another implementation of the aspect provides further calculating the exponential factor using a predetermined look back time duration and the time duration since the last refresh of the count.

Optionally in the preceding aspect, another implementation of the aspect provides further calculating the exponential factor using a cache memory size, the predetermined look back time duration, and the time duration since the last refresh of the count.

Optionally in any one of the preceding aspects, another implementation of the aspect provides calculating a performance metric of memory access frequency to one or both of the faster access storage medium and the slower access storage medium; and automatically adjusting, using processing circuitry of the computer system, one or more of the exponential factor, the time duration since the last refresh of the count, and the predetermined look back time duration according to the calculated performance metric.

Optionally in the preceding aspect, another implementation of the aspect provides calculating a performance metric that includes one or both of a number of cache misses and a number of cache hits.

Optionally in any of the preceding aspects, another implementation of the aspects provides the faster access storage medium is a cache memory, and determining a exponential moving average that includes determining a count of the number of access operations to a memory location; determining a weighted count for the memory location as $$C'=(n/t-C/T)*((1+\log_2(M/(C*T/t)))*Tt/(T+t))+C,$$

wherein C is the determined count of the number of access operations, C' is the determined weighted count, T is a predetermined look back time duration, t is a time duration since a last access to the memory location, n is a number of cache hits during the time duration t, and M is a size of the cache memory.

Optionally in any of the preceding aspects, another implementation of the aspects provides storing an exponential moving average determined for a memory location in the memory location with data.

Optionally in any of the preceding aspects, another implementation of the aspects provides storing the determined respective exponential moving averages in the memory as a memory map data structure.

According to another aspect of the present disclosure there is provided a memory system. The memory system includes a first memory array, a second memory array, and a memory controller. Access to the first memory array is faster than access to the second memory array. The memory controller includes processing circuitry that counts a number of access operations to memory locations of the first and second memory arrays, determines exponential moving averages of the number of access operations to the memory locations using the number of access operations, and transfers a portion of data stored in the second memory array to the first memory array according to the determined exponential moving averages.

Optionally in the preceding aspect, another implementation of the aspect provides processing circuitry configured to calculate an exponential factor using a time duration since a last access to a memory location; and determine the exponential moving average for the memory location by weighting the number of access operations to the memory location using the exponential factor.

Optionally in the preceding aspect, another implementation of the aspect provides processing circuitry configured to calculate the exponential factor using a predetermined look back time duration and the time duration since the last access to the memory location.

Optionally in the preceding aspect, another implementation of the aspect provides a cache memory and the first memory array is included in the cache memory; and processing circuitry configured to calculate the exponential factor using a size of the cache memory, the predetermined look back time duration, and the time duration since the last access to the memory location.

Optionally in the preceding aspect, another implementation of the aspect provides processing circuitry configured to monitor one or both of cache misses and cache hits; and adjust one or more of the exponential factor, the time duration since the last refresh of the count, and the predetermined look back time duration according to a determined number of the one or both of the cache misses and cache hits.

Optionally in any of the preceding aspects, another implementation of the aspects provides processing circuitry configured to store an exponential moving average determined for a memory location with data in the memory location.

Optionally in any of the preceding aspects, another implementation of the aspects provides processing circuitry configured to store the determined respective exponential moving averages in memory of the memory system as a memory map data structure.

According to another aspect of the present disclosure there is provided a network node device of a communication network. The network node device includes processing circuitry that determine exponential moving averages of a number of network access operations transmitted to multiple endpoint devices of the communication network, and initiates transfer of a portion of data stored in a first endpoint device of the multiple endpoint devices to a second endpoint device of the multiple endpoint devices to the determined exponential moving averages.

Optionally in the preceding aspect, another implementation of the aspect provides processing circuitry configured to calculate an exponential factor using a time duration since a last access to a memory storage location, and determine the exponential moving average for the memory storage location by weighting the number of access operations to the memory storage location using the exponential factor.

Optionally in the preceding aspect, another implementation of the aspect provides processing circuitry configured to calculate the exponential factor using a predetermined look back time duration and a time duration since the last refresh of the count.

Optionally in any of the preceding aspects, another implementation of the aspects provides the network device being a content caching router of the communication network and the processing circuitry is configured to determine exponential moving averages of a number of network access operations transmitted to multiple servers of the communication network.

BRIEF DESCRIPTION OF THE DRAWINGS

Some figures illustrating example embodiments are included with the text in the detailed description.

DETAILED DESCRIPTION

In the following description, reference is made to the accompanying drawings that form a part hereof and, in which are shown, by way of illustration, specific embodiments that may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules which may be software, hardware, firmware or any combination thereof. Multiple functions may be performed in one or more modules as desired, and the embodiments described are merely examples. The software may be executed on a digital signal processor, application specific integrated circuit (ASIC), microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term "logic" encompasses any functionality for performing a task. For instance, each operation illustrated in the flowcharts corresponds to logic for performing that operation. An operation can be performed using software, hardware, firmware, or the like. The terms "component," "system," and the like may refer to computer-related entities, hardware, and software in execution, firmware, or combination thereof. A component may be a process running on a processor, an object, an execution, a program, a function, a subroutine, a computer, or a combination of software and hardware. The term "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term "article of manufacture," as used herein, is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media (i.e., not limited to storage media) may additionally include communication media such as transmission media for wireless signals and the like.

Computing systems include processing resources (e.g., processing units) and data storage resources (e.g., various forms of memory or memory storage devices). The processing resources can be physically or logically located with the data storage resources (e.g., when the computing system is a processing node, personal computer (PC), laptop computer, smartphone, etc.), or the processing resources can be located separate from the data storage resources (e.g., a distributed database system, cloud computing system, etc.).

Hotspots in the storage resources refer to memory locations or storage devices that see high volume of access operations. Detecting hot spots among memory locations of a computing device or among storage devices of a computer network is important in many storage and network applications such as enterprise storage, cloud service, and network content caching. More precise detection of storage hotspots can lead to improvements in caching and tiering of stored data.

Figure 1:
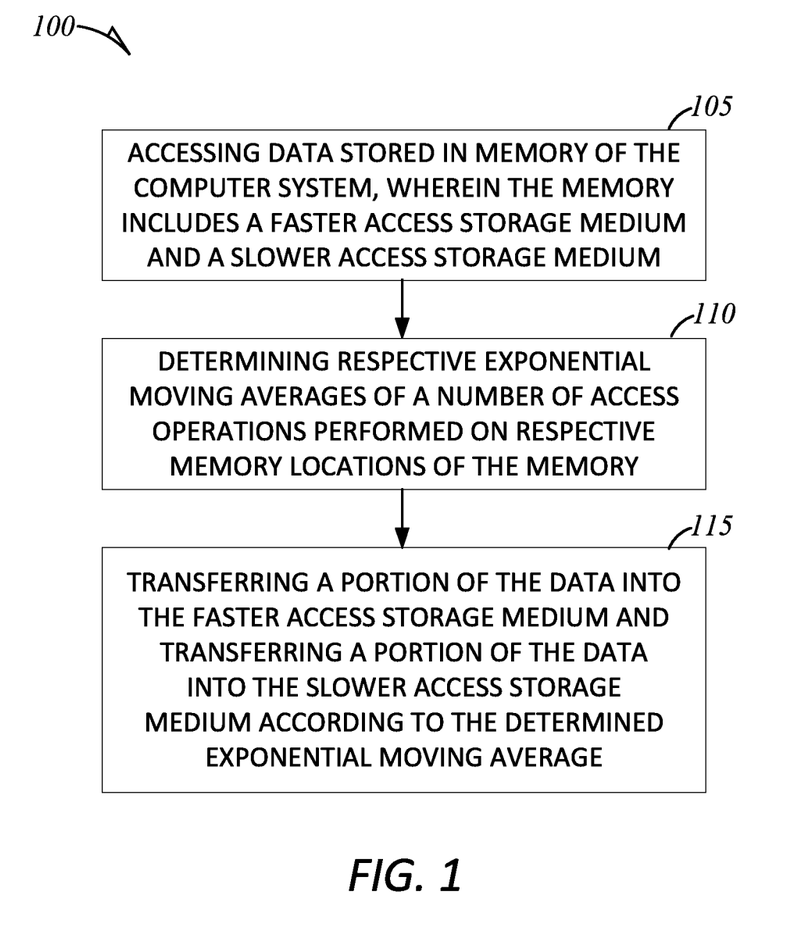
FIG. 1 is a flow diagram of a computer implemented method of managing stored data in a computer system to implement one or more example embodiments.

FIG. 1 is a flow diagram of a method 100 of managing stored data in a computer system. The location of the stored data can be moved to optimize access to the data, such as by reducing access time to detected hotspots in the system or by eliminating bottle necks in accessing the data for example.

At block 105 of the flow diagram, data stored in memory of the computer system is accessed. The access is by the processing resources of the computer system. The processing resources can be one or more processors (e.g., central processing units or CPUs). The memory includes a faster access storage medium and a slower access storage medium. In certain examples, the faster access storage medium is dynamic random access memory (DRAM) and the slower access storage medium is non-volatile memory (NVM). In certain examples, the faster access storage medium is a cache memory and the slower access storage medium is shared memory. Cache memory may be local to a processor to provide low latency for memory operations, while shared memory may have longer latency due to the protocol for accessing the shared memory.

At block 110, exponential moving averages are determined for access operations to the memory locations of one or both of the faster access storage medium and the slower access storage medium. A count may be determined for the number of access operations to a memory location and the exponential moving average for the memory location is determined using the count. Based on the exponential moving average, it is determined if the memory location is a hotspot. This calculation can be used to identify hotspots in the memory. Based on the identified hotpots, the data can be reallocated to improve efficiency.

At block 115, the data in memory locations that are hotspots can be transferred and stored in the faster access storage medium. This reduces latency in the access to the hotspots. Memory locations in the faster access storage medium that are not hotspots can be transferred and stored in the slower access storage medium. The exponential moving average can also be used to identify memory locations in the access storage medium that are "cool" spots that aren't seeing much if any traffic, and the data of the cool spots can be moved to the slower access storage medium. Hotspots and cool spots can be identified by comparing the exponential moving average to one or both of a hotspot threshold value and a cool spot threshold value.

In calculating the exponential moving average, a weighted count of the access operations to a memory location can be used, and higher weight can be given to the more recent memory access operations. This can provide a faster response time to changes in the hotspots than merely a simple moving average (SMA).

In some examples, the weighted count is calculated as $$C'=(n/t-C/T)*((1+\log_2(M/(C*T/t)))*Tt/(T+t)+C,$$

where C is the determined count of the number of access operations, C' is the determined weighted count, T is the predetermined look back time duration, t is the time duration since the last counter data refresh, n is the number of cache hits during the time duration t, and M is the size of the memory. The symbol "*" is used herein as the multiplication operator and "/" is used as the division operator. The exponential moving average of the weighted is then determined. The value of $$X=(1+\log_2(M/(C*T/t))$$

can be referred to as an exponential factor X and the exponential factor is initialized to X=1 to initially match the unweighted average behavior.

The aggressiveness of the exponential moving average can be adjusted by adjusting values of parameters X, T, and t. Machine learning or artificial intelligence (AI) can be used to dynamically adapt the exponential moving average to optimize performance by changing the parameters. The processing circuitry of the computer system may calculate a performance metric of the memory operations and adjust the parameters of the exponential moving average accordingly to improve performance.

The performance metric can be related to the frequency of access to one or both of the faster access storage medium and the slower access storage medium. The machine learning or AI algorithm changes the parameters of the exponential moving average to converge on a solution. For example, if the number of memory operations to the faster access storage medium is decreasing, the processing circuitry can change the values of the parameters to increase the number of accesses to the faster access storage medium. This could be accomplished by reducing the parameter "t" because t is the interval between counter data refresh. A smaller number value of t means the counter data is refreshed more frequently, and a larger value of t is used for a less aggressive approach. Changing the value of the look back period T will also have an impact on the response. A smaller value of T results in a shorter look back period and increases the aggressiveness of the machine algorithm.

To converge the machine learning or AI algorithm, positive feedback on the performance metric may be determined. As an example, stochastic gradient descent (SGD) can be used as feedback on the performance of the memory. In SGD, the true gradient is approximated by the gradient (w) at a single example, where $$w:=w-\eta \nabla Q_i(w),$$

where $\eta$ is the step size, $Q_i$ is a cost function that is minimized.

As processing circuitry of the computer system sweeps the machine learning or AI algorithm through the training set, the above update to the gradient is performed for each training example. Several passes can be made over the training set until the algorithm converges. The data can be shuffled for each pass to prevent cycles. Implementations may use an adaptive learning rate so that the algorithm converges.

For the stochastic gradient descent technique, the SGD can be determined as follows:
   Choose an initial vector of parameters (X,T,t) and a learning rate initialized as 1.
   Repeat the following until an approximate minimum is obtained:
      Randomly shuffle examples in the training set.
      For pass I=1, 2, 3 . . . m, do:
         $w:=w-\eta \nabla Q_i(w).$ Stochastic gradient descent is just one option that can be used to gauge the performance of the memory. Other options include an adaptive gradient algorithm (AdaGrad), Root Mean Square Propagation (RMSProp), adaptive moment estimation (Adam), and a second order optimizer (e.g., Newton-Raphson algorithm).

Figure 2:
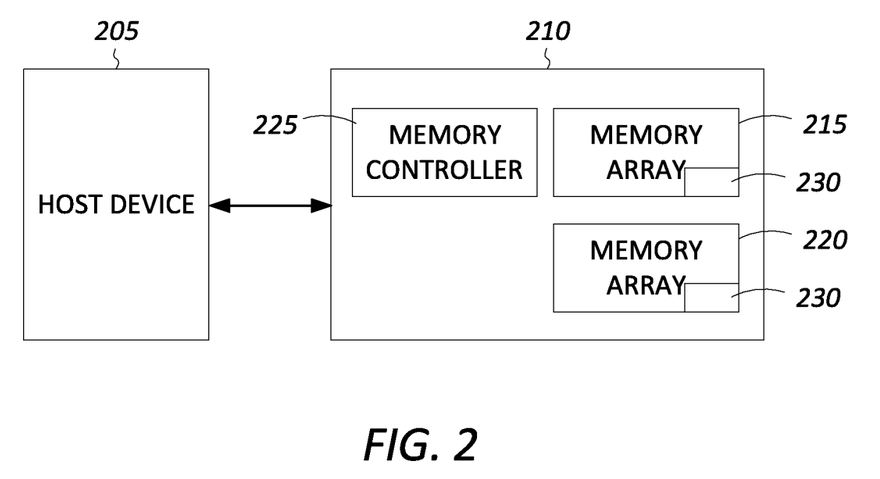
FIG. 2 is a block diagram of a memory system to implement one or more example embodiments.

FIG. 2 is an example of portions of a memory system that can perform the example method of FIG. 1. The memory system 210 includes a first memory array 215, a second memory array 220, and a memory controller 225. The memory system 210 may be included in a computer system that includes a host device 205. The memory controller 225 processes memory requests from the host device 205. Access to the first memory array is faster than access to the second memory array. In some examples, the first memory array includes DRAM and the second memory array includes NVM.

The memory controller includes processing circuitry to calculate the exponential moving averages of memory locations of the memory arrays. In response to detecting memory hotspots using the calculated moving averages, the memory controller 225 may transfer a portion of data from the slower access memory array 220 to the faster access memory array 215. The memory controller 225 may also transfer cool spots of the faster access memory 215 array to the slower access memory array 220. This improves system performance by moving the more frequency operations to the fast memory.

Figure 3:
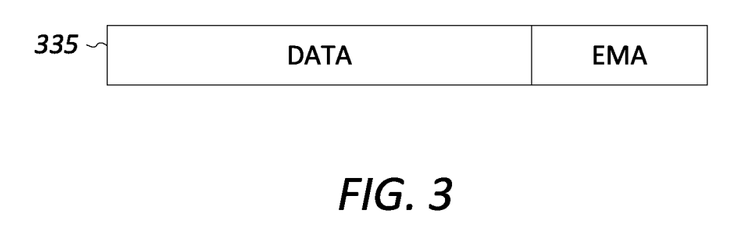
FIG. 3 is an illustration of a memory location to implement one or more example embodiments

The exponential moving averages may be stored in one of the memory arrays as a memory map data structure 230. Which memory array is used to store the memory map may depend on how often the memory map is updated. FIG. 3 shows a variation in which the exponential moving average (EMA) determined for a memory location 335 is stored with the data in the memory location.

In some examples, the faster access memory array is included in a cache memory of the memory system and the slower access memory array is included in main memory of the memory system. The cache memory is used to store information frequently used by the host device 205. The main memory is used to store information that is used less often and may be shared by the host device 205 and other host devices. In response to detecting memory hotspots using the calculated moving averages, the memory controller 225 may transfer a portion of data from the slower main memory to the faster cache memory. The performance metric can include one or both of the number of cache hits and cache misses of the cache memory. The memory controller performs the machine learning or AI algorithm to transfer data to cache memory to improve the cache hit ratio of the memory system.

In addition to improving the performance of memory devices and system, the exponential moving average can be used with a machine language or AI algorithm to improve performance of a communication network. A communication network includes multiple network node devices communicating information using communication channels. A network node device is a computing device able to receive, send, forward, and process information to other nodes of the network using paths of the network. Some examples of a network node device include a network server, network router, a network hub, and a host computer. A network node device can be a physical device or a virtual device. Traditionally, routing of packetized data in a network uses shortest path routing. A "hello" protocol between immediate neighbor nodes in the network can be used to form agencies and connected nodes, and links of the entire network can be advertised using a flooding process. Shortest Path First route computation algorithms can be used to compute Next Hops (NHs) for all routes that are advertised in the network.

A content delivery network, or content distribution network (CDN) is a geographically distributed network of proxy servers and the data centers that include the servers. CDNs are used to distribute requested content to end users with high availability and performance of the distribution service. An example of a CDN is enterprise storage. Enterprise storage is designed to handle large volumes of data and a large number of concurrent users. Enterprise storage systems can include storage area networks. In content caching, data is delivered from the servers closest to the requester geographically. When content needs to be accessed, the data content can be retrieved from any of the cached locations based on geographic location, performance, and bandwidth of the network. Detecting hotspots can result in the data being moved to optimize performance.

CDN node devices are usually deployed in multiple locations, often over multiple Internet backbones. Requests for content are typically algorithmically directed to network node devices that are optimal for the request in some way. Locations that are optimal for serving content to a specific user may be chosen to provide the best performance. The best sources for the content may be measured by choosing locations that are the fewest hops away from the requesting client, the lowest number of network seconds away from the requesting client, or have the highest availability to the user. An adaptive exponential moving average algorithm can be used to identify "hot" content in the storage devices of a CDN.

Figure 4:
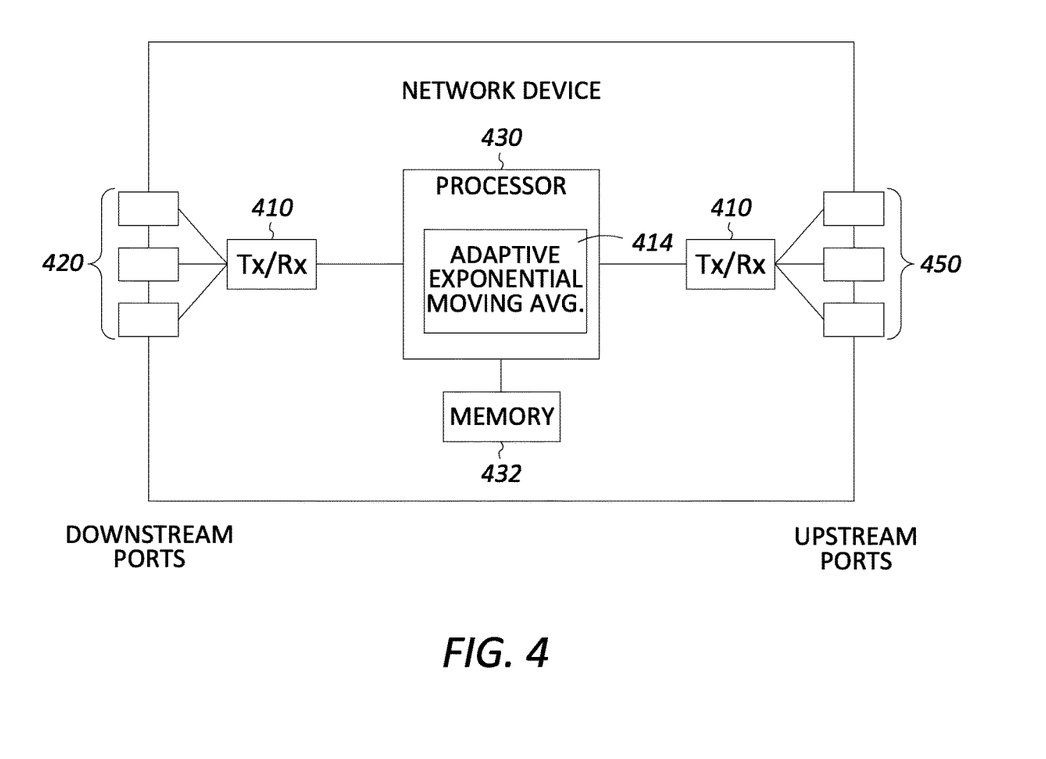
FIG. 4 is schematic diagram of a network device to implement one or more example embodiments.

FIG. 4 is a schematic diagram of an example of a network node device 400 for implementing a machine learning or AI algorithm that identifies "hot" data content in an endpoint (e.g., a storage server) of a CDN. The network node device 400 may be a device that communicates electrical and/or optical signals through a network, e.g., a switch, router, bridge, gateway, etc. In some cases, the network device 400 may act alone, or in concert with other network node devices 400 to operate a virtual network device with the functionality described herein. As shown in FIG. 4, the network node device 400 may comprise transceivers (Tx/Rx) 410, which may be transmitters, receivers, or combinations thereof. A Tx/Rx 410 may be coupled to a plurality of downstream ports 420 (e.g., downstream interfaces) for transmitting and/or receiving frames from other nodes and a Tx/Rx 410 coupled to a plurality of upstream ports 450 (e.g., upstream interfaces) for transmitting and/or receiving frames from other nodes, respectively. A processor 430 may be coupled to the Tx/Rxs 410 to process the data signals and/or determine to which nodes to send data signals.

Processor 430 may be implemented as a general processor or may be part of one or more ASICs and/or digital signal processors (DSPs). The network device 400 may comprise a data packet encoding module 414, which may be configured to encode data packets with a PPR-ID. The data packet encoding module 414 may be implemented in a general-purpose processor, a field programmable gate array (FPGA), an ASIC, a DSP, a microcontroller, etc. In alternative embodiments, the data packet encoding module 414 may be implemented in processor 430 as computer executable instructions stored in memory device 432 (e.g., as a computer program product stored in a non-transitory computer readable medium), which may be executed by processor 430, and/or implemented in part in the processor 430 and in part in the memory device 432. The downstream ports 420 and/or upstream ports 450 may contain wireless, electrical and/or optical transmitting and/or receiving components, depending on the embodiment.

The network node device 400 may be a content caching router of a communication network or CDN. The processing circuitry of the network node device 400 monitors network traffic to track requests to the endpoint devices of the network and determines exponential moving averages for the number of network access operations transmitted to the endpoint devices. The exponential moving averages can detect a memory storage device (e.g., a storage server) that stores data content that is "hot" and sees a high amount of traffic. The exponential moving average places a greater weight on the more recent transfers. This can provide a fast response to changes in the network. In response, the network node device may transfer (or initiate the transfer through a request) of portion of the data to a better location or to a number of locations to increase the speed of the access to the data or to decrease any network bottlenecks that slow access to the data. For example, the data may be moved to one or more storage servers to shorten the path to the data from the requesting devices.

The processing circuitry of the network node device 400 may adjust the identification of endpoint hotspots by adjusting the parameters of the exponential moving average calculations using one of the machine learning or AI algorithms described herein. The algorithm monitors a performance metric of the network and adjusts the parameters to optimize the metric. In some examples, the performance metric is the length of a network path or the number of hops in network traffic. The algorithm may adjust the calculation of the exponential moving averages to respond faster to increases in network path length or number of hops.

Figure 5:
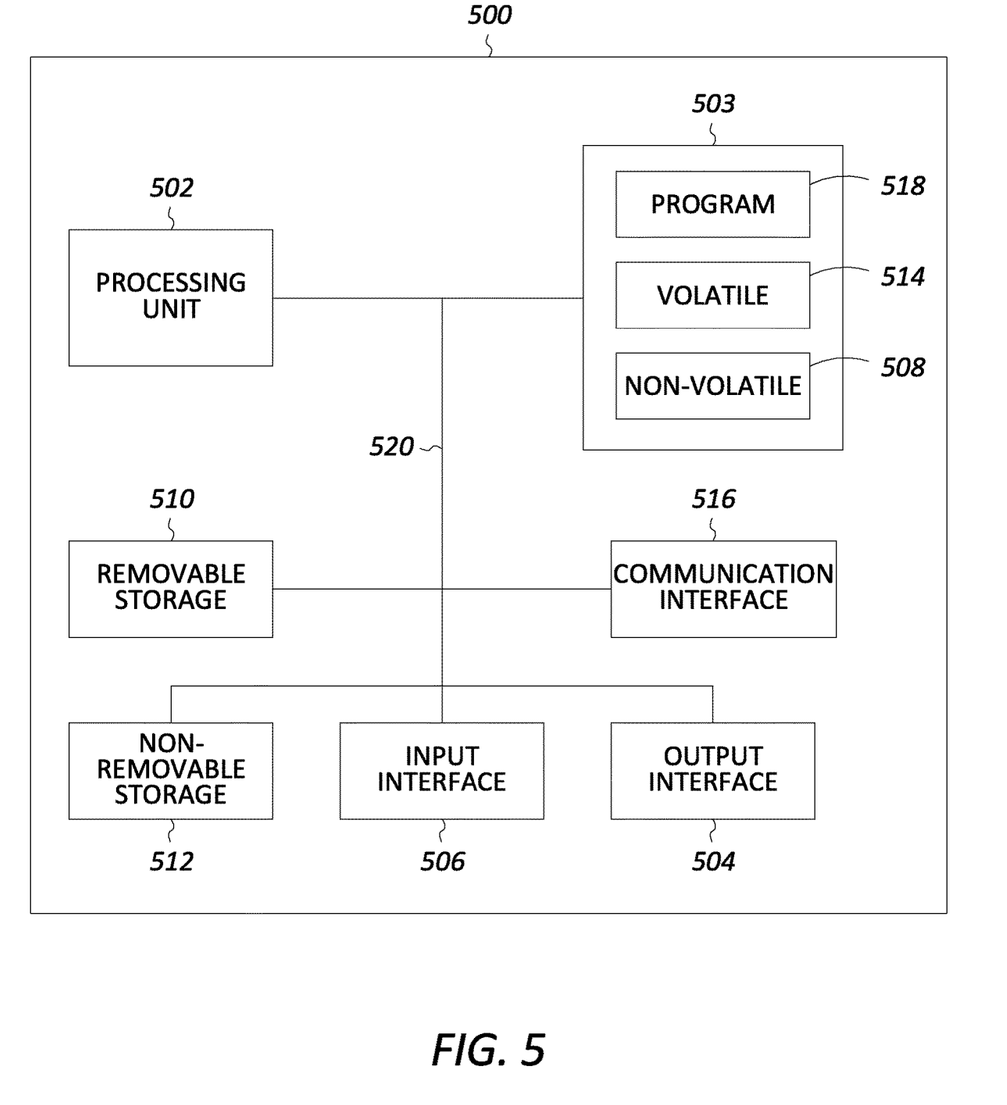
FIG. 5 is a block schematic diagram of a computer system to implement one or more example embodiments.

FIG. 5 is a block schematic diagram of a computer system 500 for performing methods and algorithms according to example embodiments. All components need not be used in various embodiments.

One example is a computing device that may include a processing unit 502, memory 503, removable storage 510, and non-removable storage 512. Although the example computing device is illustrated and described as computer 500, the computing device may be in different forms in different embodiments. For example, the computing device may be a server, a router, or a virtual router.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random-access memory (RAM), read-only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer 500 may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium, such as a storage device. The terms computer-readable medium and storage device do not include carrier waves to the extent carrier waves are deemed too transitory. Storage can also include networked storage, such as a storage area network (SAN). Computer program 518 along with the workspace manager 522 may be used to cause processing unit 502 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method performed by a computer system that includes one or more processing resources, memory, and a memory controller, the method comprising:
   accessing data stored in the memory using the one or more processing resources, wherein the memory includes a faster access storage medium and a slower access storage medium;
   determining a count of the number of access operations to respective memory locations;
   determining a weighted count of the access operations to the respective memory locations using a time duration since a last refresh of the count;
   determining, using the memory controller, respective exponential moving averages of the weighted count of access operations performed on the respective memory locations of the memory; and
   transferring, using the memory controller, a first portion of the data into the faster access storage medium and transferring a second portion of the data into the slower access storage medium according to the determined exponential moving averages.

2. The computer implemented method of claim 1, wherein the determining the respective exponential moving averages includes:

weighting the determined count using an exponential factor calculated using the time duration since a last refresh of the count.

3. The computer implemented method of claim 2, wherein the exponential factor is further calculated using a predetermined look back time duration and the time duration since the last refresh of the count.

4. The computer implemented method of claim 3, wherein the exponential factor is further calculated using a cache memory size, the predetermined look back time duration, and the time duration since the last refresh of the count.

5. The computer implemented method of claim 3, including:
    calculating a performance metric of memory access frequency to one or both of the faster access storage medium and the slower access storage medium; and
    automatically adjusting, using processing circuitry of the computer system, one or more of the exponential factor, the time duration since the last refresh of the count, and the predetermined look back time duration according to the calculated performance metric.

6. The computer implemented method of claim 5, wherein the performance metric includes one or both of a number of cache misses and a number of cache hits.

7. The computer implemented method of claim 1, wherein the faster access storage medium is a cache memory, and wherein the determining the respective exponential moving averages includes:
    determining the weighted count for the memory location as $$C'=(n/t-C/T)*((1+\log_2(M/(C*T/t)))*Tt/(T+t))+C,$$

wherein C is the determined count of the number of access operations, C' is the determined weighted count, T is a predetermined look back time duration, t is a time duration since a last access to the memory location, n is a number of cache hits during the time duration t, and M is a size of the cache memory.

8. The computer implemented method of claim 1, including storing an exponential moving average determined for a memory location in the memory location with data.

9. The computer implemented method of claim 1, including storing the determined respective exponential moving averages in the memory as a memory map data structure.

10. A memory system comprising:
    a first memory array and a second memory array, wherein access to the first memory array is faster than access to the second memory array; and
    a memory controller operatively coupled to the first and second memory arrays and including processing circuitry configured to:
        count a number of access operations to memory locations of the first and second memory arrays;
        determine a weighted count of the access operations to the memory locations using a time duration since a last refresh of the count of access operations;
        determine exponential moving averages of the weighted count of access operations to the memory locations; and
        transfer a portion of data stored in the second memory array to the first memory array according to the determined exponential moving averages.

11. The memory system of claim 10, wherein the processing circuitry of the memory controller is configured to:
    calculate an exponential factor using a time duration since a last access to a memory location; and
    determine the weighted count and the exponential moving average for the memory location using the exponential factor.

12. The memory system of claim 11, wherein the processing circuitry of the memory controller is configured to calculate the exponential factor using a predetermined look back time duration and the time duration since the last refresh of the count of access operations.

13. The memory system of claim 12, including:
    a cache memory, and the first memory array is included in the cache memory;
    wherein the processing circuitry of the memory controller is configured to calculate the exponential factor using a size of the cache memory, the predetermined look back time duration, and the time duration since the last refresh of the count of access operations.

14. The memory system of claim 13, wherein the processing circuitry of the memory controller is configured to:
    monitor one or both of cache misses and cache hits; and
    adjust one or more of the exponential factor, the time duration since the last refresh of the count, and the predetermined look back time duration according to a determined number of the one or both of the cache misses and cache hits.

15. The memory system of claim 10, wherein the processing circuitry of the memory controller is configured to store an exponential moving average determined for a memory location with data in the memory location.

16. The memory system of claim 10, wherein the processing circuitry of the memory controller is configured to store the determined respective exponential moving averages in memory of the memory system as a memory map data structure.

* * * * *

UNITED STATES PATENT AND TRADEMARK OFFICE
CERTIFICATE OF CORRECTION

| | | |
|---|---|---|
| PATENT NO. | : 12,340,087 B2 | Page 1 of 1 |
| APPLICATION NO. | : 18/355140 | |
| DATED | : June 24, 2025 | |
| INVENTOR(S) | : Tang et al. | |

It is certified that error appears in the above-identified patent and that said Letters Patent is hereby corrected as shown below:

On the Title Page

Item (71), in "Applicant", in Column 1, Line 2, delete "Guangdong" and insert --Shenzhen, Guangdong-- therefor In the Claims In Column 11, Line 34, in Claim 7, delete "Tis" and insert --T is-- therefor Signed and Sealed this
Nineteenth Day of August, 2025

Coke Morgan Stewart
*Acting Director of the United States Patent and Trademark Office*